Figure 1:
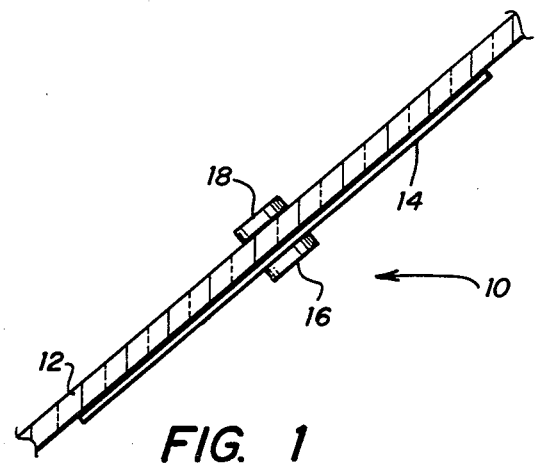

United States Patent [19]

Chary

[11] 4,351,557
[45] Sep. 28, 1982

[54] LIGHT SHIELD FOR VEHICLES HAVING TRANSPARENT MEMBERS

[76] Inventor: Rajagopala M. N. Chary, 5400 Windy Meadow Dr., Arlington, Tex. 76017

[21] Appl. No.: 167,818

[22] Filed: Jul. 14, 1980

[51] Int. Cl.³ .............................................. B60J 3/02
[52] U.S. Cl. ............................. 296/97 D; 248/206 A
[58] Field of Search ................. 296/97 D; 248/206 A; 350/276 R

[56] References Cited

U.S. PATENT DOCUMENTS 2,634,444 4/1953 Coleman ......................... 248/206 A
2,715,043 8/1955 Schewel ........................... 296/97 D

*Primary Examiner*—Robert R. Song
*Attorney, Agent, or Firm*—Charles W. McHugh

[57] ABSTRACT

A light-blocking device similar to a so-called sun visor, which is adapted for use in vehicles having transparent members such as glass windshields or windows. The device includes a shield in the form of a relatively stiff and generally flat sheet having sufficient opacity to at least serve as a light-filtering medium. A preferred material for the shield is a sheet of polarized plastic having a thickness of 0.030 inch or less, and a minimum area of about 70 square centimeters. A first magnet is affixed to one side of the shield in such a way that the shield may lay generally flush against the inside surface of the transparent member. A second magnet is adapted to be placed on the outside of the vehicle's transparent member in a position so that it is juxtaposed with the interior magnet. The first and second magnets respectively have magnetic orientations such that their confronting faces have opposite polarities, with the result that the two magnets are attracted to each other and the shield is held adjacent the transparent member by the interacting magnetic fields of the two magnets. Each of the magnets preferably has a minimum magnetic strength of about 800 gauss, so that wind loads on the outer magnet will not cause it to be blown off when the vehicle travels at reasonable speeds. In the daytime, the shield is continually re-positioned from time to time in order to remain on a line which extends generally between the sun and the driver's eyes, and the position of the shield is changed by manually adjusting only the interior magnet; the position of the outside magnet is automatically changed by virtue of the magnetic attraction between two magnets. At night time, the shield is positioned on a side window and selectively moved to and from a position where it blocks light reflected from an external rearview mirror (when a second vehicle approaches the first vehicle from the rear).

17 Claims, 5 Drawing Figures

LIGHT SHIELD FOR VEHICLES HAVING TRANSPARENT MEMBERS

This invention relates generally to safety devices for use on vehicles, and more specifically it relates to a filter or shield for use in blocking at least some of the light rays which could interfere with the normal vision of a driver or other occupant in the vehicle. A common, although not necessarily accurate, name for such a safety device is a sun visor.

It has long been recognized that operators of vehicles, and especially drivers of automobiles and trucks, are greatly hampered in their task of guiding their vehicles when a blinding light is positioned such that its rays can enter a person's eyes. For this reason, it is common for vehicles to be provided with opaque shields, commonly called sun shields or sun visors, which are mounted interiorly of a vehicle at a position adjacent the vehicle's windshield. A person driving westwardly in the late afternoon toward a setting sun would typically move a sun visor so that it blocks off the sun's direct rays, thereby permitting the driver to see at least some of the road and traffic ahead of him—except for that region which is completely blocked off by the sun visor. The size of such an opaque sun visor is obviously of some concern to those persons who are involved with traffic safety, and governmental agencies often have seen fit to issue regulations in this field—even to the extent of proscribing a maximum size for a vehicle sun visor.

The mere size of a traditional sun visor is not the only factor which is significant, however, and the placement of that sun visor is also quite important. It has been common to mount conventional sun visors on a horizontal rod having a pivotal mounting bracket at the corners of a windshield, so that a sun visor can be used either directly in front of a driver or to his left side. Such a pivotable sun visor has not been without its limitations, though, especially when the direction from which the sun's rays are coming is below or beyond the "reach" of a permanently mounted sun visor. To overcome these deficiencies, it has been proposed in U.S. Pat. No. 2,613,104 to Parsons to provide an independently movable "light reflector" which can be held at essentially any desired position around a metal window frame or windshield frame. A permanent magnet is secured to an edge of a planar sheet, and the magnet serves as the attaching means for mounting the sheet at any of a variety of positions. While the Parsons construction may have had significant utility in 1950 (when most window frames were made of steel), the modern use of light-weight and non-magnetic materials such as plastics around windows and windshields has rendered the Parsons construction essentially obsolete.

An alternative to the Parsons magnetically-held sun visor is a sun visor adapted to be held to a glass pane by a suction cup, which is shown in U.S. Pat. No. 2,715,043 to Schewell. The Schewell construction offers much more flexibility in selecting a mounting location, because it can be attached to a windshield at most any place where a rubber suction cup can establish an adequate seal to the glass pane. While the principle of the Schewell construction is certainly meritorious—in theory, those persons who have had practical experience with suction cups can testify that they often lack true effectiveness in holding something for an extended period in a vertical or near vertical plane. And, a sun shield which falls off the windshield at an inopportune time can contribute to greater problems than were perhaps initially solved by providing such a sun visor. Thus, if a driver is distracted by his need to suddenly recover a fallen sun visor and then labor to re-mount it on the windshield in front of him, his distraction from the road and surrounding traffic could even contribute to an accident. Hence, the inherent deficiencies of suction cups which are small enough to be useful on a sun visor but large enough to create an adequate vacuum (with resultant holding power) have left open the possibility of still further improvements in sun visors. Accordingly, it is an object of this invention to provide an article in the nature of a sun visor which overcomes many of the above-described problems.

Another object is to provide a relatively small sun visor or glare protector which is particularly easy to position exactly where it is needed in order that the overall size of the device is not unduly great.

Still another object is to provide a device which requires essentially no installation effort, and which can be easily transferred from one car to another.

Still another object is to provide a construction which is useful at nighttime to block any offending light rays emanating from a car approaching from the rear—and more specifically, light rays which would otherwise be visible in an external rear-view mirror.

Figure 2:
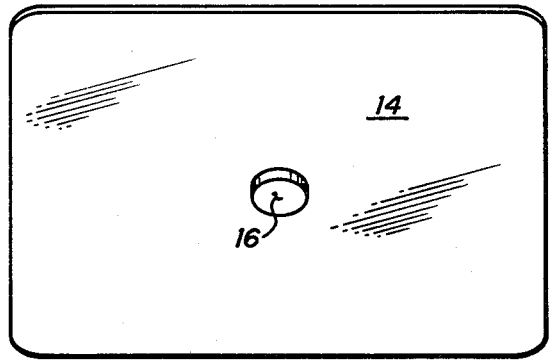
Figure 3:
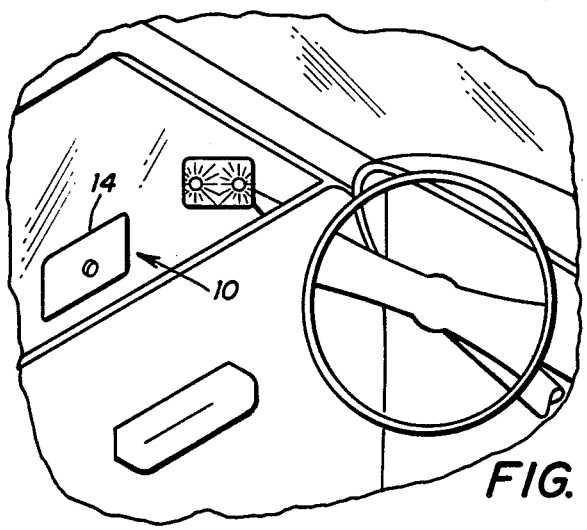
Figure 4:
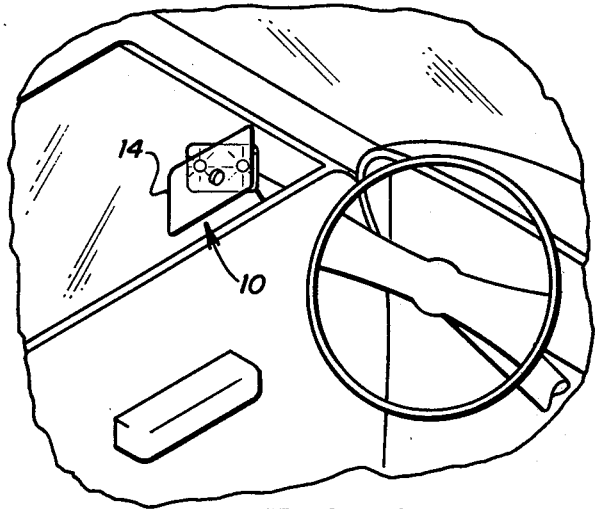
Figure 5:
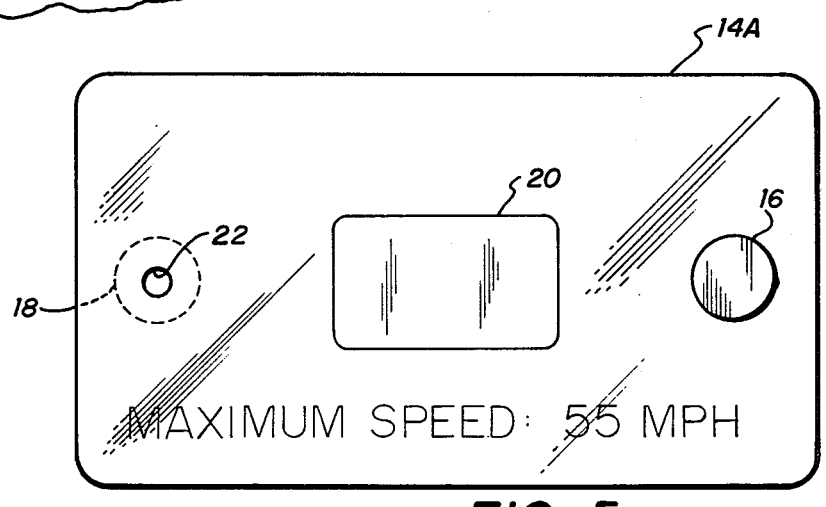

These and other objects will be apparent from a study of the specification and claims appended thereto, as well as the attached drawing in which FIG. 1 is a cross-sectional, elevational view through the windshield of a representative automobile, and showing one embodiment of the invention mounted in an operative position on the windshield;

FIG. 2 is a front elevational view of the construction shown in FIG. 1, as seen from the interior of the vehicle, FIG. 3 is an elevational view of an exterior rear-view mirror, as seen from the interior of a vehicle at a location typically occupied by the driver;

FIG. 4 is an elevational view corresponding to FIG. 3, wherein a magnetically held light shield has been moved to a position where it blocks any offending light rays from a following vehicle; and FIG. 5 is a plan view of an exemplary shield which is adapted to have two pairs of holding magnets, with the pairs of magnets being respectively located at opposite ends of the shield, and one of the interior magnets being omitted to show an underlying hole in the shield.

Before proceeding with a detailed description of the invention, it is interesting to note that the U.S. Government has seen fit to regulate the amount of reflectance which is permissible from surfaces within an automobile, e.g., the reflectance from instrument panels, windshield wiper arms, rear-view mirror mounting hardware, the horn ring, etc. One such Federal Standard (No. 515-13 entitled "Glare Reduction Surfaces—Instrument Panel and Windshield Wipers for Automotive Vehicles") proscribes the maximum amount of light reflection which is permissible within the operator's field of view. Of course, the greatest source of hazardous light which could temporarily blind a driver is not reflected light; it is the light which comes directly from a relatively bright source such as the sun or another vehicle's headlights. Hence, all of the well-intentioned governmental regulations with regard to controlling reflections off interior surfaces in an automobile is really of minor significance—as compared with the matter of dealing with direct impingement of light rays. Furthermore, there are at least two other sources of reflected light which are not regulated and which are much greater than anything which exists within a given automobile, namely, the light which reaches a driver's eyes after being reflected from certain exterior surfaces of other vehicles (such as windows, mirrors and shiny bumpers), and naturally occurring "reflectors" such as ice, snow and wet streets. It should be appreciated that the construction disclosed herein is ideally suited to handle all of the above-mentioned direct and indirect sources of light, because the glare-preventor described herein can be moved to essentially any location on a windshield or side window. That is, the shield disclosed herein is not restricted by any artificial limits of mounting hardware, space or weight limits, etc.; it can be placed where it is needed at any given time to block light from a specific source without simultaneously creating an unnecessarily large "dead space" behind the shield.

In brief, the invention comprises a filter or shield of light-weight, planar material (such as a sheet of translucent plastic) to which is securely affixed a small magnet. The size of a preferred plastic shield is about 125 square centimeters, and the configuration is preferably that of a generally rectangular shape, typically about 12.5 cm by 10 cm. Ideally, the shield has an opacity which is similar to that of material which is utilized in sunglasses, and it may be polarized to enhance its sun-blocking qualities. A second magnet is not permanently connected to either the shield or the first magnet, but it is shaped so that it may be easily juxtaposed with the first magnet in order that the magnetic fields of the two magnets may cooperate to attract each other. In use, the shield and its connected magnet are adapted to be placed next to the interior side of a transparent member (such as a window or windshield) in a vehicle. The other magnet is then manually placed on the exterior side of the transparent member and juxtaposed with the first magnet, such that the two magnetic fields will interact and the shield will be held in place by the mutual attraction of the two magnets. For use on wheeled vehicles such as automobiles, trucks and motorcycles, the magnets preferably have a minimum magnetic strength of about 800 gauss.

Referring specifically to FIGS. 1 and 2, the light-blocking device 10 is shown in an operative position adjacent a transparent member of a vehicle. Exemplary transparent members are windshields and windows of automobiles, trucks, boats and airplanes, as well as windscreens on motorcycles and the like. Of course, the transparent member, per se, forms no part of this invention; but it is the transparency of such a member that contributes to the problem which is solved by the present invention. Hence, a certain amount of attention is appropriate with regard to the transparent members which are likely to be encountered in practicing the invention.

Federal standards for windshields and the like are found in Motor Vehicle Safety Standards, which are primarily intended to insure that a windshield made of glass will not create a large number of potentially dangerous glass fragments if it breaks. The most common technique for avoiding dangerous glass fragments is to laminate a piece of plastic between two layers of tempered glass, with the bonded plastic serving to hold broken glass pieces together after fracture of the windshield. Nearly all windshields and side windows in modern automotive vehicles range in thickness from about 6.0 to 7.2 mm. Therefore, in order for this invention to be operative on an essentially universal basis, the magnets which are described hereinafter must be sufficiently strong as to be effective through about 0.72 cm of what is commonly referred to as safety glass.

The windshield 12 represented in FIG. 1 is inclined with respect to vertical at about 50 degrees, which is a fairly typical value for automobiles; trucks and motorcycles often have a more nearly vertical windshield or windscreen. The thickness of the light shield 14 will typically be about 30 mils, so the requisite strength of the magnets 16, 18 in order to hold the shield 14 in place on a windshield is primarily established by the thickness of the windshield.

A preferred size for the light shield 14 is about 120 square centimeters, so that there will be a sufficient quantity of light-blocking material in order that the shield will not have to be moved every time that the vehicle changes direction by a couple of degrees. That is, if the shield 14 is initially positioned so as to be centered with respect to an imaginary line between the sun and the driver's eyes, it is advantageous if the vehicle's direction can be at least slightly changed without requiring the driver to move the shield in order to maintain the value of its light-blocking properties. The minimum spot size projected by the sun is about 1.25 cm at a typical windshield. Hence, when the shield 14 has a length of about 10 cm, there is ample opportunity for the vehicle's direction to be slightly changed without requiring re-adjustment of the shield's position. A minimum size for the shield 14 is probably about 10 cm in length and 7 cm in height; such a minimum size would adequately block off any anticipated direct or reflected sun rays.

As for the maximum size of an opaque shield 14, it is believed that a size about 15×18 cm is realistic, because a larger size would approach the point of covering too much of a windshield. To explain this, it must be remembered that the shield 14 is to promote safety. And, to perhaps eliminate one hazard (such as the blinding effect of the sun's rays) but substitute another hazard (blocking off too much of a driver's frontal field of view) would not be a particularly desirable trade. It is preferred, therefore, that an opaque shield 14 be much smaller than the typical sun visor which is found in modern automobiles and trucks. But, to the extent that the shield 14 is translucent, so that a driver might see a road hazard in front of his vehicle through the shield, the rationale for establishing a maximum size is less valid.

A further consideration with regard to the maximum size of a shield is its unsupported length beyond the location of the juxtaposed magnets 16, 18. When only a single pair of magnets are utilized to hold the shield 14 next to a windshield, it is inevitable that a substantial quantity of the shield will extend in a cantilevered manner from a central "base". By making the shield exceedingly large, there is a greater opportunity for the generally flat shield to warp or bend, such that it might cause unwanted optical effects. It is therefore desirable that the shield 14 be made relatively stiff, and have an unsupported length (from its magnet) of much less than 10 cm. And, if it should be desired to make a relatively long and narrow shield 14, then two pairs of widely separated magnets would be advantageous, in oder that the unsupported distance from an edge of the shield to the nearest magnet might be kept relatively small.

The first or inner magnet 16 is preferably affixed to one side of the shield 14 with a dependable glue; and, to both foster adhesion between the shield and the magnet, it is useful to place a small aperture in the shield exactly below the spot where the magnet is to be glued, as shown by aperture 22 in FIG. 5. This is because it is easier to achieve a reliable joint when at least some kind of an edge (around the aperture) is provided. Of course, the aperture size should be somewhat less than the surface area of the magnet 16 which is to abut the shield 14. In order to foster a desirable interaction between the magnets 16, 18, it is preferred that each of the magnets 16, 18 be configured so as to be rather thin and "short". Ideally, a magnet configured like a very short cylinder with smooth ends provides a favorable interaction of two spaced magnets. As was explained hereinabove, the minimum size of the sun's image at a vehicle's windshield is about 1.25 cm; hence, a generally cylindrical magnet having a diameter of about 2 cm will offer relatively good cover for the expected light rays from the sun. Ceramic magnets made from barium ferrite or iron ferrite are particularly advantageous, for the reasons that they are relatively economical to fabricate and they offer a particularly advantageous strength-to-weight ratio. Also, ceramic magnets are quite capable of providing the minimum magnetic strength (800 gauss) which has been found to be desirable for an optimum embodiment of the invention.

The inner magnet 16 is not likely to ever make direct contact with the inside of a windshield, because it will always be separated from that inner surface by the thickness of the shield 14. The outer magnet 18, on the other hand, is always in contact with the windshield's outer surface. And, one of the advantages of the construction disclosed herein is that the light shield 14 is movable within the vehicle by merely grasping the shield, or the inner magnet 16, and gently pulling sideways. The outer magnet 18 will "track" or follow the inner magnet 16, maintaining a nearly constant spatial relationship with the inner magnet. Naturally this is advantageous as far as being able to easily change the position of a shield 14. But, if the magnetic attraction between the two magnets was excessively great, and if there was a rough texture on the inwardly facing surface of the outer magnet 18, there would be some potential for scratching the outer windshield surface with a rough magnet. To minimize the chances of scratching the outer windshield surface, it is preferred that the inwardly facing surface of the outer magnet 18 be smooth. And, to promote economy in manufacture and stocking of magnets, it is reasonable that both the inner and outer magnets be identical. Therefore, the facing surfaces of each pair of juxtaposed magnets 16, 18 are preferably smooth, such that the shield 14 may be manually pulled across a transparent member 12 without the risk of causing a scratch in the member.

If the magnets 16, 18 are made of so-called ceramic material, they will typically be opaque. And, if a single pair of juxtaposed magnets 16, 18 are provided in the center of a light shield 14, then there will obviously be a central portion of the construction which will block all light. However, the bulk of the shield 14 is preferably not completely opaque, although it will naturally have sufficient opacity to at least serve as a light-filtering medium. In the same manner as with personal sun glasses, the user will typically desire to block off those light rays which might tend to temporarily blind him; but he would not wish to introduce a barrier that would preclude him from seeing other cars, obstacles, or the roadway which may be just below the horizon. To the extent that there may be a desire to increase the opaque area in the center of a device 10 without unduly contributing to an excessively large shield, it would be appropriate to add an intermediate element 20 to the shield 14. The extra element 20 would logically have a size that is greater than the size of the magnet, but it would be smaller than the size of the shield 14; and, it would logically increase the opacity of the portion of the device 10 over which it lies. In such an embodiment, a three-tier arrangement of light-blocking effectiveness would be possible including 100% blockage in the center, about 50% blockage near the periphery, and an intermediate blockage (between 50 and 100%) between the center and the periphery. As suggested hereinbefore with regard to the minimum size of a light shield 14, it is not likely that even an intermediate element 20 would be less than 20 square centimeters.

The preferred material from which the shield 14 is fabricated is a relatively stiff plastic sheet having a thickness of at least 0.013 cm. A suitable material is Kodacel plastic sheet 7M4 produced by Eastman Plastics Products. Another satisfactory material is a dyed and "weatherized" polyester film marketed by the Transilwrap Co. of Missouri, Inc., which has an ultra-violet resistance rating of at least 10 years. If the advantages of a polarized film are desired, a 7-layer laminate offered by American Polarizers, Inc. and having a thickness of 30 mils is an excellent material for the shield 14. This API product includes a polarizing film, ultra-violet absorbers and two layers of cellulose acetate butyrate. All of the listed materials offer the necessary thermal stability which is required for an element which is likely to be stored in a parked automobile on a hot summer afternoon. Interior temperatures in an automobile which is completely closed (with windows tightly sealed, etc.) often exceed 150° F. on summer days. It follows, then, that the material for a satisfactory light shield 14 should have excellent stability in a hot environment.

In use, it will be assumed that the driver of a vehicle is about to be confronted with light rays (from the sun) which would tend to temporarily blind him if the light rays reached his eyes. And, it will be further assumed that the driver anticipates that the sun will be only a relatively small distance above the horizon and in front of his vehicle—such that the light rays are going to be directly in the driver's eyes. To block these potentially blinding light rays, the driver will place the planar shield 14 (and its attached magnet 16) on the interior surface of the windshield, and also place the other magnet 18 on the outer surface of the windshield so that the two magnets are juxtaposed. The magnetic field of the two magnets will immediately interact to hold the shield 14 where it was initially placed. Later, as the relative position between the sun and the driver's eyes changes, the shield is merely repositioned by manually pulling it along the inner surface of the windshield. That is, the driver needs only to manually adjust the position of the interior magnet and its attached shield; the position of the outside magnet is automatically changed by virtue of the magnetic attraction between the two magnets. But while the outer magnet 18 moves easily in response to manual relocation of the inner magnet 16, the outer magnet is not moved in response to any realistic wind loads on the magnet. That is, relatively small experimental models have been tested with relative wind speeds approaching 100 mph (accomplished by driving an automobile at a legal speed against a strong headwind), and the outer magnet has not been blown away from the windshield. This surprising result appears to be relatively independent of the shape of the tested magnets, as long as the magnets are relatively flat; so, commercially available magnets of conventional shape and size may be employed with the invention described herein.

If the driver changes the direction of movement of his vehicle by approximately 90°, he can still utilize the shield 14 by transferring it to one of his side windows. Or, he can utilize a second device on a side window and leave the first set on his windshield. Pulling the first device down to the bottom of his windshield will completely remove it from a position where it could be within the field of view of the driver.

Among the many advantages for the construction disclosed herein are its light weight, typically weighing ony about one-half ounce when a pair of 800 gauss magnets (each weighing about 8 grams) are utilized as the holding means. Another advantage of the construction is its adaptability at being positionable at essentially any desirable spot so as to block off light rays from a blinding sun. Additionally, the smooth and generally planar "interior" surface of the plastic shield 14 can provide a convenient place to temporarily put messages or reminders to the driver. For example, a user could write notes with a common crayon or grease pencil on the smooth plastic shield such as "cleaners", "bread and milk", "change oil", etc. Such a readily visible reminder to accomplish some task will be prominently in front of the driver at a time when he needs to see the reminder and respond to it by performing the required action. After the required action has been completed, the reminder can be wiped off the smooth plastic surface with relative ease, restoring the shield 14 to a clean condition. Also, instead of using the shield surface as a temporary memo board, the surface can also be utilized as a permanent reminder to drive in a cautious manner or behave in a desirable manner. For example, the shield 14 may have permanently printed thereon (by silk screening or the like) statements such as: "Maximum Speed: 55 MPH", "Drive Defensively", "Courtesy Pays", etc. Such a statement is illustrated on the shield 14A shown in FIG. 5. And, of course, there are also opportunities for token advertising on such a shield 14; a modest reminder in the form of the name of the merchant who gave the shield to a driver would not interfere with its basic function as a shield to block off offensive light rays.

In addition to utility of the device 10 during daylight hours, it is also of substantial value at night time. Perhaps one of the most offensive things that can happen to the driver of a vehicle is to have a car approach from the rear with high-beam headlights shining brightly into the eyes of the leading driver—through reflections in rearview mirrors. Many vehicles have dual-mode rearview mirrors on the inside of the vehicle, so that a driver might switch from a daylight mode to a night time mode—in order to diminish the offensive light which would otherwise reach his eyes. As far as is known, though, there is no comparable technique for switching external mirrors into a mode that effectively softens the glare of headlights from a trailing vehicle. A person who wishes to eliminate offensive reflections in his external mirror is forced to manually change the adjustment of the mirror, either by virtue by maneuvering a remote-control knob on the inside of the vehicle or reaching his hand through an open window and physically touching the mirror in order to change its orientation. Regardless of how the outside rearview mirror is changed, the action of the driver in defeating the effectiveness of his rearview mirror is obviously not a safe practice, for the reason that the mirror is no longer functional to warn the driver of another approaching vehicle. Until such time as the driver readjusts his outside mirror, he has greatly diminished his sensory tools for maintaining awareness of what is going on around him. By use of this invention, however, a driver does not have to change the orientation of his external mirror, and its effectiveness is never completely eliminated.

Using the device 10 at night time is accomplished by placing the device on the window in a position so that it is near the line of sight between the driver's eyes and the external mirror, as shown in FIG. 3. Anytime that a driver of an approaching vehicle fails to dim his headlights and an offensive glare becomes visible in an external rearview mirror, the driver who has the device 10 available to him need only pull the shield 14 slightly forward so that it lies directly on a line which extends from the mirror to the driver's eyes (shown in FIG. 4). The harsh effect of the offending light rays is instantaneously removed, although at least some light will still be visible through a translucent shield 14. If the following car should pass the first car or turn off on a side road, the driver can immediately restore his rearview mirror to 100% effectiveness by merely sliding the shield 14 backward by a few cms. Such a procedure is obviously much safer than previously employed techniques, in that it never completely eliminates the utility of a rearview mirror, no matter how temporary such an interruption may be. And this procedure does not require the distraction of a driver who may be trying to properly adjust his rearview miror at a time that he should be concentrating on the road or traffic in front of him. For this reason alone, the construction disclosed herein is believed to have substantial value as a safety device for travel on streets and highways.

In so far as some of the goals of two particular constructions are concerned, the present device may be said to be similar to the device shown in U.S. Pat. No. 4,003,597 to Acuff. That is, both the Acuff device and the present device are conerned with the elimination of what Acuff calls "sun blindness", particularly in those areas not protected by a conventional automobile sun visor. However, the Acuff device is operable only in conjunction with a conventional sun visor—not independently thereof; hence, there is no apparent way in which an Acuff device could be used to eliminate offending light rays in an external rearview mirror—without simultaneously blocking off an inordinate amount of visibility to the side of a vehicle.

In describing the use of the present construction, the word "driver" has been regularly utilized—as a brief way of referring to the occupant of a vehicle who is most likely to benefit from the device 10. It should be understood, though, that any other occupant of a vehicle could also utilize one or more of the devices 10. Hence, the word "driver" should be understood to broadly encompass any vehicle occupant who wishes to have protection from offending light rays. The device 10 is as readily serviceable on one side of a vehicle as the other, and at any time of day and in any kind of weather. Indeed, a standard outer magnet 18 has been found to hold a shield 14 in place just as well in rainy weather as in dry weather, etc. This wet-proof property of the device 10 naturally means that it could be utilized on a boat having a windshield just as readily as on an automobile or truck, etc.

While only a preferred embodiment of the invention (plus a few modifications thereof) have been described in great detail herein, it should be apparent to those skilled in the art that numerous variations on the basic idea would be possible without departing from the spirit of the invention. For example, the strength of the magnets could be increased—if desired. But increasing magnet strength by a factor of 10 would still require only a modest force (between one and two pounds) to move a shield around on the inside of a window. Accordingly, the invention would be deemed to be limited only by the scope of the appended claims.

What is claimed is:

1. A light-blocking device adapted for use in vehicles having transparent members such as glass windshields or windows, comprising:
   (a) a shield in the form of a relatively stiff and generally flat sheet having sufficient opacity to at least serve as a light-filtering medium;
   (b) a first magnet affixed to one side of said shield, and said magnet having a size appreciably smaller than said shield, and said magnet being affixed in such a way that the shield may lay generally flush against the inside surface of the transparent member; and
   (c) a second magnet adapted to be placed on the outside of the vehicle's transparent member in a position so that it is juxtaposed with the first or interior magnet, and the first and second magnets respectively having a magnetic orientation such that their confronting faces have opposite polarities, with the result that the two magnets are attracted to each other and the shield is held adjacent the transparent member by the interacting magnetic fields of the two magnets, and each of the magnets having a minimum magnetic strength of about 800 gauss.

2. The device as claimed in claim 1 wherein each side of the shield has a minimum surface area of about 70 square centimeters.

3. The device as claimed in claim 1 wherein the first magnet is centrally located with respect to the shield.

4. The device as claimed in claim 1 wherein the shield is fabricated from a relatively thin plastic material which is polarized, and the opacity of the material is sufficiently low as to permit a vehicle occupant to at least partially see through the shield.

5. The device as claimed in claim 1 wherein a second pair of cooperating magnets are utilized in conjunction with the first pair of magnets for holding the shield next to the transparent member, and the interior magnets of the respective pairs are located adjacent the opposite ends of the shield.

6. The device as claimed in claim 1 wherein the shield is fabricated from vinyl plastic having a thickness of at least 0.013 cm, such that the edges of the shield are stiffly supported in an inclined plane by a central pair of magnets.

7. The device as claimed in claim 1 wherein each of the pair of magnets has the same size, and each is about three square centimeters in frontal area.

8. The device as claimed in claim 1 wherein the pair of magnets are ceramic magnets made from the class of materials which includes barium ferrite and iron ferrite.

9. The device as claimed in claim 1 wherein the facing surfaces of the pair of juxtaposed magnets are smooth, whereby the construction may be manually pulled across the transparent member without risking the creation of a scratch in said member.

10. The device as claimed in claim 1 wherein the shield has a generally rectangular shape, and the height-to-width ratio of the rectangle is about 0.7.

11. The device as claimed in claim 1 wherein the shield has weight of substantially less than ½ ounce.

12. The device as claimed in claim 1 wherein a central portion of the device has an opacity which is substantially greater than the opacity of a peripheral portion of the device.

13. The device as claimed in claim 12 wherein the central portion has a minimum frontal area of about 20 square centimeters.

14. The method of providing an obstacle to light rays which would otherwise tend to temporarily blind the driver of a vehicle if the offending light rays reached the driver's eyes, comprising the steps of:
   (a) mounting a light-weight planar shield on the interior surface of a transparent member adjacent the vehicle driver, with the mounting step being accomplished with a pair of cooperating magnets, with the interior one of the magnets being affixed to the shield and being positioned on the inside of the vehicle, and the other magnet being juxtaposed with the first magnet and placed on the outside of the transparent member; and
   (b) changing the position of the shield as the relative position of the light source with respect to the driver's eyes changes, in order that the shield is continually re-positioned as necessary in order to remain on a line which extends between the light source and the driver's eyes, and the position of the shield being changed by manually adjusting only the interior magnet, with the position of the outside magnet being affected only by the magnetic attraction between the two magnets.

15. The method as claimed in claim 14 wherein the offending light rays emanate from a vehicle which is following the driver, and wherein the driver places the planar shield on the window of his vehicle in such a position that it blocks light reflected by his external rearview mirror.

16. The method as claimed in claim 14 wherein each of the pair of cooperating magnets has a strength of about 800 gauss, and the confronting faces of the magnets are smooth, and the pair of magnets are repositioned by sliding them across the transparent member without any measurable risk of scratching said transparent member.

17. The method as claimed in claim 14 wherein the position of the shield is changed by manually sliding the shield along the transparent member without separating the shield from the transparent member, whereby the magnetic attraction between the two magnets is not deleteriously affected.

* * * * *